Figure 1:
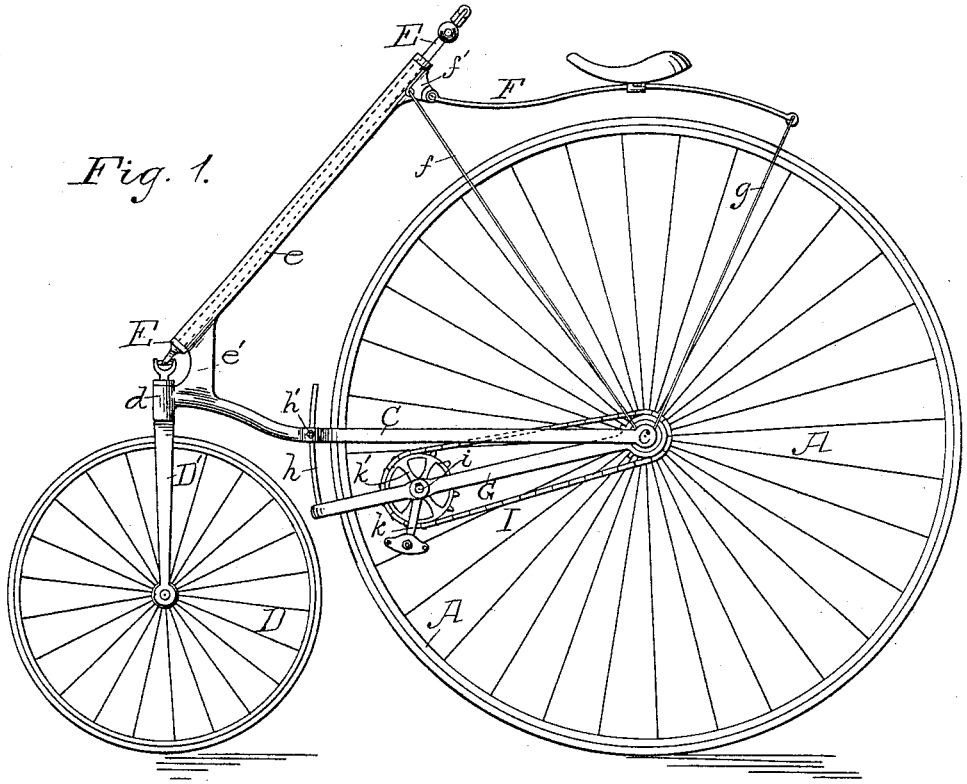

(No Model.)  2 Sheets—Sheet 1.

G. W. MARBLE.
BICYCLE.

No. 328,499. Patented Oct. 20, 1885.

WITNESSES:
Edward W. Schirach.
Jno. W. Sickels

George W. Marble
INVENTOR

BY James H. Coyne
ATTORNEY (No Model.) 2 Sheets—Sheet 2.
G. W. MARBLE.
BICYCLE.
No. 328,499. Patented Oct. 20, 1885.
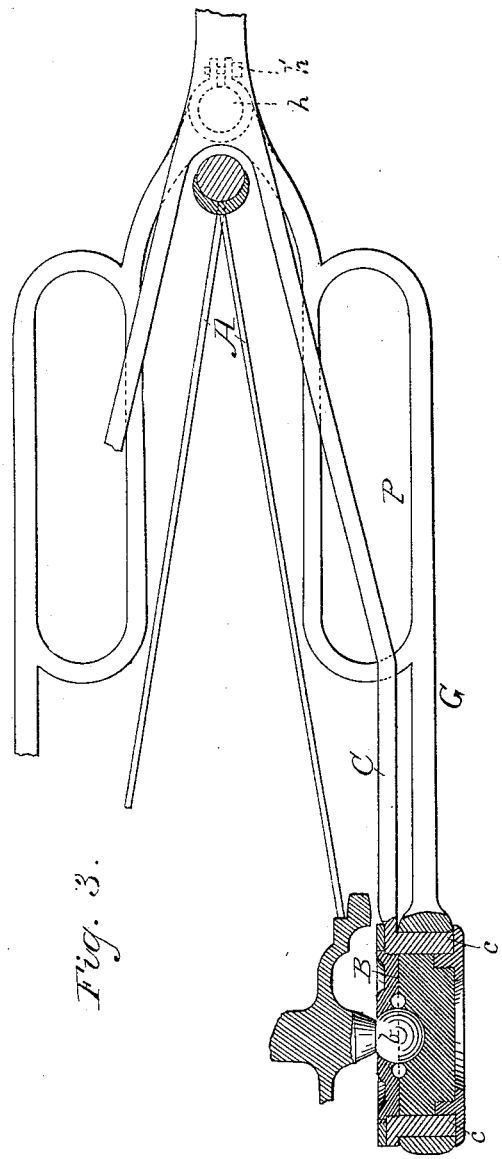
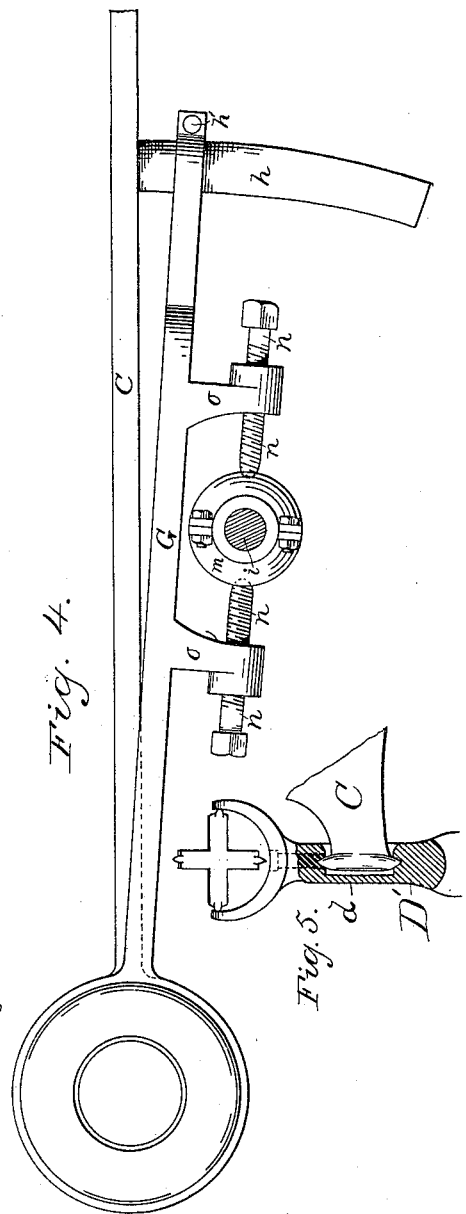
WITNESSES:
Edward W. Schwrach
Jno. W. Sickels
George W. Marble
INVENTOR
BY Jas H. Coyne
ATTORNEY

UNITED STATES PATENT OFFICE.

GEORGE W. MARBLE, OF CHICAGO, ILLINOIS.

BICYCLE.

SPECIFICATION forming part of Letters Patent No. 328,499, dated October 20, 1885.

Application filed October 22, 1884. Serial No. 146,148. (No model.)

*To all whom it may concern:*

Be it known that I, GEORGE W. MARBLE, of Chicago, in the county of Cook and State of Illinois, have invented certain new and useful Improvements in Bicycles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The objections heretofore made to most bicycles is their height and the liability to take headers when they meet an obstacle. The latter objection has been overcome by a machine which has the small wheel in front, and this arrangement I adopt in my bicycle; but the former objection still exists in most, if not all, bicycles in current use, and this I make it a special object to avoid by decreasing the diameter of the drive-wheel, journaling the pedals in oscillating arms fulcrumed on the bearings of the drive-wheel, and providing suitable means for imparting the motion of said pedals to the drive-wheel, substantially as hereinafter fully described, and as illustrated in the drawings, in which—

Figure 2:
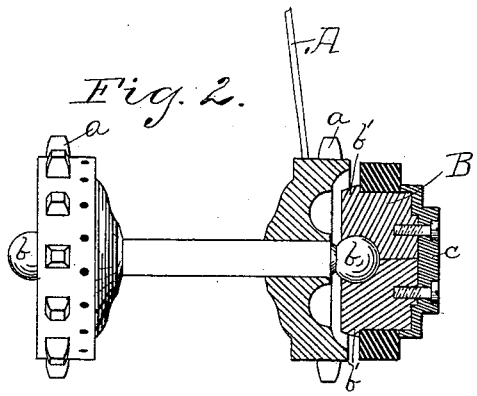

Figure 1 is a side elevation. Fig. 2 is a detail view showing a vertical transverse section of the journal and bearings of the drive-wheel. Figs. 3 and 4 show, respectively, a plan and a side elevation of a modified form of the oscillating yoke; and Fig. 5 is a detail view showing a modified form of the steering-head.

Reference being had to the drawings, A represents the drive-wheel, having sprockets *a a*, made, preferably, integrant with the hubs, and having a spherical journal, *b*. These journals *b b* rest and revolve in the correspondingly bearing chambers of the bearings B. The bearings B are circular in form, have a circumferential bead, *b'*, on the edge contiguous to the hub of the drive-wheel, and are divided horizontally and transversely through the center for convenience of manufacture and construction.

Secured to the outer surfaces of the bearing B, and provided with a circumferential flange, which adapts the same to fit over a portion of the circumference of the said bearings to keep the two parts thereof together, are the ends *c c* of the bifurcated reach C. This reach C pursues a longitudinal course from the drive-wheel to a point over the front or guide wheel, D, intersected by a vertical line drawn through the axis of said wheel, where it terminates in a vertical bearing, *d*. This bearing is adapted to receive the tang of the front fork, D', which latter is provided at its upper end, just above the confines of the bearings, with a crescent, in the extremities of which are journaled two opposite arms of a cross-shape piece of flat steel. The other two arms of this cross are journaled in the extremities of a corresponding crescent rigidly connected to and depending from the lower end of the guide-rod E, thus forming one of the ordinary forms of the swivel joint.

If desired, instead of the forward end of the reach terminating in a bearing, as shown, it may terminate in a neck having steering points or centers, which are pivoted in sockets in the head of the front fork, D', which latter would have the crescent (referred to above) affixed to its upper end. This construction of the steering devices is shown in Fig. 5 of the drawings, and is preferred to that previously described.

The guide-rod E pursues a vertical oblique course to the rear of the machine, as shown in Fig. 1, and is journaled in the tubular frame *e*. It is provided with the usual handles to manipulate it at its upper end. The frame *e* is secured at its lower end to the forward end of the reach C by means of a brace or web, *e'*, connecting the two parts, and its upper end is supported and maintained in position by means of the rods *f*, which latter are secured in the ends *c c* of the bifurcated reach C, and the upper ends in a lug, *f'*, extending to the rear from the upper end of said frame *e*.

Secured to the extremity of lug *f'* is the bifurcated forward end of the saddle-spring F, which latter pursues a longitudinal course to the rear of a vertical line intersecting the axis of said drive-wheel, where it is supported and maintained by the rods *g*, the lower ends of which are secured—like rods *f*—in the ends *c c* of the bifurcated reach C.

Journaled or pivoted on the bearings B, between the bead *b'* and the edge of the circumferential flange of the ends of the bifurcated reach C, is the U frame or yoke G. Yoke G travels from one bearing around the tread of the drive-wheel to the other, and the angle at which it is maintained to the plane of the reach is regulated by means of a segmental rod, $h$, projecting upward from the bend of said yoke, just in front of and following the curvature of the drive-wheel, which passes through a suitable aperture made in that portion of the reach C about where the arms of the bifurcated end thereof meet, and is held in the position desired by means of a set-screw, $h'$, passing laterally into the reach in such position as to impinge against and bite the same. If desired, the rod $h$ may be rigidly affixed to and extend downward from the reach and through the split end of the yoke G, where, by means of a screw passing laterally through said split portions, the yoke can be clamped in any position desired, substantially as shown in Fig. 3.

Journaled in the arms of the yoke G a suitable distance from the point of oscillation are the pedal-shafts $i$, to the outer ends of which are affixed the cranks $k$, having the pedals near their extremities. On the inner end of the crank or pedal shaft is a sprocket-wheel, $k'$, preferably of a diameter greater than the sprockets $a$ $a$, to which they impart their motion by means of a link chain, I. As it is desirable to have the bearing of the pedal-shaft adjustable longitudinally in or on the arms of the yoke for the twofold purpose of tightening the link chain I and accommodating the reach or throw of the driver's leg, I have, as shown in Figs. 3 and 4, suspended the bearings $m$ below arms of the yoke by means of cap-screws $n$ $n$, which pass laterally through the lugs $o$ $o$, extending downward on either side of said bearings from the under surface of the arms of the yoke, and into suitable recesses in the bearings. Thus by advancing one screw $n$ and withdrawing the other the bearings $m$ may be adjusted within the limits of the lugs $o$. If desired, there may be two of the bearings $m$ on each side of the drive-wheel to support both ends of the pedal-shaft. In this event I divide the arm of the yoke at $p$, as shown in the drawings, and suspend the bearings as above described, and place the sprocket-wheel in the center of the shaft, so that its upper half moves between the parallel frames made by dividing the yoke. This latter construction of the bearings of the pedal-shaft is preferred; but for a cheaper machine the construction previously described, and shown in Fig. 1, will answer.

In Fig. 3 is shown in section another bearing for the drive-wheel. In this the end of the bifurcated reach has a ring, which surrounds the circular exterior or periphery of the bearing, and the ring of the oscillating yoke is journaled on the ring of the ends of the reach. The remainder of the construction shown is adapted to hold the rings of the reach and yoke in position.

Various changes may be made in the details of construction of my bicycle; but these I claim as coming within the spirit of my invention.

What I claim as new, and desire to secure by Letters Patent, is—

1. In a bicycle, the combination, with the drive-wheel, guide-wheel placed in front thereof, and saddle supported above said drive-wheel, and frames for supporting the same thereat, of the pedals, adjustable frame in which said pedals are journaled, and means for imparting their motion to the drive-wheel.

2. In a bicycle, the combination, with the drive-wheel, guide-wheel placed in front thereof, and the bifurcated reach connecting said wheels, of the adjustable yoke fulcrumed on the bearings of said drive-wheel, pedals journaled and radially adjustable therein, and means for imparting the motion of said pedals to the drive-wheel.

3. In a bicycle, the combination, with the drive-wheel, guide-wheel placed in front thereof, and bifurcated reach connecting said wheels, of the circular segmental rod $h$, the adjustable yoke G, having an aperture in its end, through which said rod passes, and screw by means of which said yoke is adjusted and maintained in any position on said rod, pedals journaled in said yoke, and means for imparting the motion of said pedals to the drive-wheel.

4. The combination, in a bicycle, with the drive-wheel, the axis of which has spherical journals, of the bearing B, having a spherical bearing-chamber and a circular exterior, the oscillating yoke G, and bifurcated reach C, fulcrumed and secured thereto, respectively.

5. The combination, in a bicycle, with the drive-wheel, the axis of which has spherical journals, of the bearings B, made in two parts and having a circular circumference, the oscillating adjustable yoke, and the bifurcated reach, both of which have circular apertures in their ends, and are journaled on said bearings, and means, substantially as shown, for securing them thereon.

6. The combination, with the drive-wheel of a bicycle, of yoke G, fulcrumed on the bearings thereof, lugs $o$ $o$, extending downward therefrom, cap-screws $n$ $n$, bearings $m$, pedal-shafts $i$, journaled therein, and means for imparting their motion to the drive-wheel.

In testimony that I claim the foregoing as my own I hereunto affix my signature in presence of two witnesses.

GEORGE W. MARBLE.

Witnesses:
EDWARD W. SCHIRACH,
FRANK D. THOMASON.